United States Patent
Kamishima

(10) Patent No.: US 9,627,902 B2
(45) Date of Patent: Apr. 18, 2017

(54) CHARGING CONTROL APPARATUS AND CHARGING CONTROL METHOD

(75) Inventor: Utaka Kamishima, Machida (JP)

(73) Assignee: NISSAN MOTOR CO., LTD., Yokohama-shi (JP)

(*) Notice: Subject to any disclaimer, the term of this patent is extended or adjusted under 35 U.S.C. 154(b) by 972 days.

(21) Appl. No.: 13/702,238

(22) PCT Filed: Jun. 9, 2011

(86) PCT No.: PCT/JP2011/003260
§ 371 (c)(1),
(2), (4) Date: Dec. 5, 2012

(87) PCT Pub. No.: WO2011/155206
PCT Pub. Date: Dec. 15, 2011

(65) Prior Publication Data
US 2013/0082655 A1    Apr. 4, 2013

(30) Foreign Application Priority Data
Jun. 9, 2010 (JP) ................. 2010-131983

(51) Int. Cl.
*H02J 7/00* (2006.01)
*B60L 3/04* (2006.01)
(Continued)

(52) U.S. Cl.
CPC .............. *H02J 7/0052* (2013.01); *B60L 3/04* (2013.01); *B60L 11/14* (2013.01);
(Continued)

(58) Field of Classification Search
CPC .................................................. H02J 7/0052
(Continued)

(56) References Cited

U.S. PATENT DOCUMENTS

| | | | |
|---|---|---|---|
| 5,684,379 A | 11/1997 | Svedoff | |
| 7,688,024 B2* | 3/2010 | Kamaga | B60L 3/0069 180/65.21 |
| 8,000,858 B2 | 8/2011 | Tonegawa et al. | |
| 8,368,350 B2* | 2/2013 | Iwanaga | B60K 6/445 320/109 |
| 8,937,455 B2* | 1/2015 | Mitsutani | B60K 6/445 320/109 |
| 2005/0174094 A1 | 8/2005 | Purdy et al. | |
| 2006/0152191 A1 | 7/2006 | Lee et al. | |
| 2010/0079105 A1 | 4/2010 | Iwanaga et al. | |
| 2010/0268406 A1* | 10/2010 | Ito | B60L 3/0023 701/22 |

(Continued)

FOREIGN PATENT DOCUMENTS

| | | |
|---|---|---|
| JP | 7-298502 A | 11/1995 |
| JP | 8-502160 A | 3/1996 |

(Continued)

OTHER PUBLICATIONS

European Extended Search Report, Dec. 3, 2013, 8 pages.

*Primary Examiner* — Richard V Muralidar
(74) *Attorney, Agent, or Firm* — Foley & Lardner LLP

(57) ABSTRACT

A method for controlling charge after judging as to whether a charging cable CC connected to a charging inlet E1 of a vehicle conforms to standards has detecting whether a control signal is outputted from the charging cable CC and whether power is supplied from the charging cable CC after the charging cable CC is connected to the charging inlet E1 until a main switch E5, E6 of a power feed line E8 of the vehicle is switched ON; judging that the charging capable CC does not conform to the standards at least when no control signal is detected and the power is detected; and forbidding the charge or limiting a charging current through the charging cable CC when judging that the charging cable CC does not conform to the standards.

12 Claims, 3 Drawing Sheets

(51) Int. Cl.
  *B60L 11/14* (2006.01)
  *B60L 11/18* (2006.01)
  *H01M 10/44* (2006.01)

(52) U.S. Cl.
  CPC ....... *B60L 11/1816* (2013.01); *B60L 11/1846* (2013.01); *H01M 10/44* (2013.01); *H02J 7/0036* (2013.01); *H02J 2007/0001* (2013.01); *Y02T 10/70* (2013.01); *Y02T 10/7005* (2013.01); *Y02T 10/7072* (2013.01); *Y02T 10/7077* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
  USPC ........................................................ 320/109
  See application file for complete search history.

(56) References Cited

U.S. PATENT DOCUMENTS

| | | |
|---|---|---|
| 2011/0127956 A1 | 6/2011 | Mitsutani |
| 2013/0088200 A1* | 4/2013 | Kamishima ............... B60L 3/04 |
| | | 320/109 |

FOREIGN PATENT DOCUMENTS

| | | |
|---|---|---|
| JP | 2007-252016 A | 9/2007 |
| JP | 2010-81740 A | 4/2010 |
| WO | WO 94/24775 A1 | 10/1994 |
| WO | WO 2009-034877 A1 | 3/2009 |
| WO | WO 2010/060370 A1 | 6/2010 |

\* cited by examiner

CHARGING CONTROL APPARATUS AND CHARGING CONTROL METHOD

TECHNICAL FIELD

The present invention relates to a charging control apparatus and a charging control method.

BACKGROUND ART

As a related art control system for charging a drive battery unit for a hybrid vehicle, it is disclosed in, for example, Japanese Patent Provisional Publication No. 2010-81740 (hereinafter is referred to as JP2010-81740). In the control system in JP2010-81740, a resistance element is provided on an extending signal line that extends from a pilot signal line, and it is proposed to judge whether a connector of a charging cable is actually disconnected from a charging inlet of the vehicle or an operation button for releasing the connector of the charging cable from a mechanical lock between the charging inlet and the connector is merely pressed, on the basis of a change of a signal level inputted through the extending signal line.

CITATION LIST

Patent Literature

Japanese Patent Provisional Publication No. 2010-81740

SUMMARY OF THE INVENTION

A vehicle charging system is a system that is in conformity with SAE standards (Society of Automotive Engineers Standards). However, in the case of the related art control system, it is impossible to judge whether or not the charging cable meets the SAE standards.

It is therefore an object of the present invention to provide a charging control apparatus and a method for controlling the charge, which are capable of judging whether or not the charging cable meets the SAE standards.

According to one aspect of the present invention, a charging control apparatus for judging conformity of a charging cable to standards, the charging cable having a power feed unit for supplying power to a vehicle from an external power supply provided outside the vehicle and a control unit for generating a control signal and outputting the control signal to the vehicle, the charging control apparatus comprises: a control signal detection section that detects the control signal; a power detection section that detects the power; and a judgment section that judges conformity of the charging cable to standards on the basis of the control signal detected by the control signal detection section and the power detected by the power detection section after the charging cable is connected to a charging inlet of the vehicle until a main switch of a power feed line on the vehicle side is switched ON.

According to another aspect of the present invention, a charging control apparatus comprises: a charging cable having (a) a power feed unit for supplying power to a vehicle from an external power supply provided outside the vehicle and (b) a control unit for generating a control signal and outputting the control signal to the vehicle, a control signal detection section that detects the control signal; a power detection section that detects the power; and a judgment section that judges conformity of the charging cable to standards on the basis of the control signal detected by the control signal detection section and the power detected by the power detection section after the charging cable is connected to a charging inlet of the vehicle until a main switch of a power feed line on the vehicle side is switched ON.

According to a further aspect of the present invention, a method for controlling charge after judging as to whether a charging cable connected to a charging inlet of a vehicle conforms to standards, comprises: detecting whether a control signal is outputted from the charging cable and whether power is supplied from the charging cable after the charging cable is connected to the charging inlet until a main switch of a power feed line of the vehicle is switched ON; judging that the charging cable does not conform to the standards at least when no control signal is detected and the power is detected; and forbidding the charge or limiting a charging current through the charging cable when judging that the charging cable does not conform to the standards.

Advantageous Effects of Invention

According to the present invention, on the basis of the control signal and the power signal after the charging cable is connected to the charging inlet of the vehicle until the main switch of the power feed line on the vehicle side is switched ON, the conformity of the charging cable to standards is judged, and the above problem is solved.

DESCRIPTION OF EMBODIMENTS

In the following description, an example in which a charging control apparatus of an embodiment of the present invention is used in a charging system for an electric vehicle will be explained.

Figure 1:
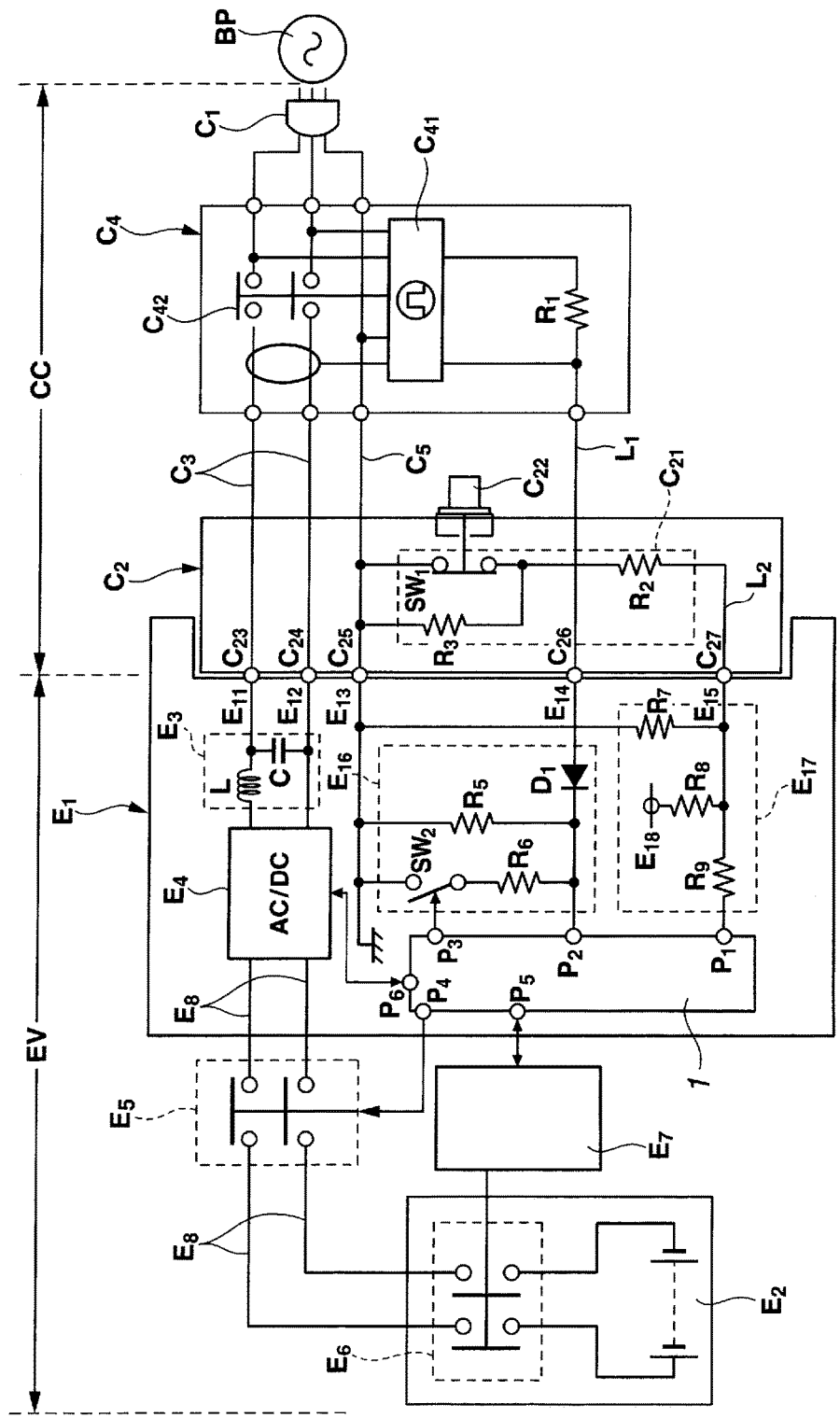
FIG. 1 is an electric circuit diagram showing a charging system that employs an embodiment of the present invention.

FIG. 1 shows an example of the system that charges a battery E2 of a secondary battery mounted in an electric vehicle EV by connecting a first connector C1 of a charging cable CC to an external power supply BP provided outside the vehicle and connecting a second connector C2 of the charging cable CC to a charging inlet E1 of the electric vehicle EV.

In FIG. 1, although a charging control apparatus 1 is employed in the electric vehicle EV, it is not limited to the electric vehicle EV. The charging control apparatus 1 could be employed in a hybrid vehicle in which an internal combustion engine and an electric motor for generating power to drive the vehicle are mounted. The battery E2 supplies power to the electric motor (not shown) and on-vehicle equipment (not shown).

One end of a power line C3 of the charging cable CC is provided with the first connector C1 that connects to the external power supply BP such as an electric outlet of a commercial power supply provided in a house. The other end of the power line C3 is provided with the second connector C2 that connects to the charging inlet E1 of the electric vehicle EV.

Further, the charging cable CC is provided with a control unit C4. The control unit C4 has a signal generating section C41 and a relay switch C42. The signal generating section C41 generates a pulse signal that corresponds to a rated current feedable to the electric vehicle EV through the power line C3. The relay switch C42 interrupts the power line C3 with the aim of preventing fault current.

The signal generating section C41 has CPU, ROM and RAM that operate by power supplied from the external power supply BP and has an oscillator that generates the pulse signal. The pulse signal generated in the signal generating section C41 is outputted to an input port P2 of the charging control apparatus 1 through a resistance element R1, a control signal line L1 and an interface circuit E16.

The second connector C2 is provided with a connection judging circuit C21. The connection judging circuit C21 has a switch SW1 whose one end is connected to a ground wire C5, a resistance element R2 that is connected to the switch SW1 in series and a resistance element R3 that is connected to the switch SW1 parallel to the switch SW1. An output signal of this connection judging circuit C21 is inputted, as a connection detection signal that indicates whether the charging cable CC is connected to the charging inlet E1, to an input port P1 of the charging control apparatus 1.

The second connector C2 is provided with a mechanical lock system (not shown) in order that the second connector C2 inserted into the charging inlet E1 is not disconnected from the charging inlet E1, also is provided with an operation button C22 for releasing the lock system. When an operator such as a driver presses the operation button C22 to disconnect the second connector C2 of the charging cable CC from the charging inlet E1, the lock system is released by this pressing operation, and the disconnection of the second connector C2 is made. The operation button C22 and the switch SW1 are configured to work in conjunction with each other. When the operation button C22 is pressed, the switch SW1 of the connection judging circuit C21 is brought to an open state (OFF) by and in response to this pressing operation of the operation button C22. When releasing the pressing operation, the switch SW1 is returned to a closed state (ON).

Here, since the lock system, the operation button C22 and the switch SW1 work in conjunction with each other, even if the operator does not press the operation button C22 when fitting and inserting the second connector C2 of the charging cable CC into the charging inlet E1, the operation button C22 is pressed for a moment by the fit between the second connector C2 and the charging inlet E1 by the lock system and the switch SW1 also shifts to OFF state for a moment.

The second connector C2 of the charging cable CC is provided with a pair of power terminals C23 and C24 that connect to the power line C3, a ground terminal C25 that connects to the ground wire C5, a signal terminal C26 that connects to the control signal line L1 outputting the pulse signal, and a signal terminal C27 that connects to an output signal line L2 of the connection judging circuit C21.

The charging inlet E1 is provided with a plurality of terminals E11~E15 that are connected to the terminals C23~C27 of the second connector C2 respectively.

Further, the charging inlet E1 has the charging control apparatus 1. The charging control apparatus 1 has ROM storing a control program, RAM used as a working area, and nonvolatile memory saving control data upon the power-off.

The charging inlet E1 is provided, as peripheral circuits of the charging control apparatus 1, with the interface circuit E16 and a connection state determining circuit E17. The interface circuit E16 detects a signal level of the pulse signal inputted to the charging inlet E1, also changes the signal level in two levels. The connection state determining circuit E17 is connected to an output terminal of the connection judging circuit C21.

The interface circuit E16 has a diode D1, resistance elements R5 and R6 that lower the signal level of the pulse signal inputted through the diode D1, and a switch SW2.

The switch SW2 is formed by a transistor element etc., and performs ON/OFF operation by a command signal from an output port P3 of the charging control apparatus 1. The charging control apparatus 1 outputs the command signal that closes the switch SW2 from the output port P3 when the connection state determining circuit E17 determines that the first connector C1 is connected to the external power supply BP and also the second connector C2 is connected to the charging inlet E1.

The connection state determining circuit E17 is formed by a resistance voltage dividing circuit having resistance elements R7, R8 and R9. The resistance element R7 is connected to the connection judging circuit C21 parallel to the connection judging circuit C21 between the signal terminal C27 of the connection judging circuit C21 and the ground wire C5. The resistance element R8 is connected to this parallel circuit in series, and one end of the resistance element R8 is connected to a power supply El8 (e.g. DC 5V).

Operation of the interface circuit E16 and the connection state determining circuit E17 will be described later.

The charging inlet E1 is configured so that after high voltage power supplied from the power line C3 of the charging cable CC which connects to the charging inlet E1 is converted to DC power by an AC/DC converter E4 through an LC filter E3 having a coil L and a capacitor C, the DC power is fed to the battery E2 of a high voltage battery unit.

On a power line E8 between the AC/DC converter E4 and the battery E2, a relay switch E5 that performs ON/OFF operation by a command signal outputted from an output port P4 of the charging control apparatus 1 and a relay switch E6 that performs ON/OFF operation by a command signal (a command signal based on a command signal outputted from an input/output terminal port P5 of the charging control apparatus 1) from a vehicle controller E7 are provided. The relay switch E5 is termed also a charging relay switch. The relay switch E6 is termed also a main relay switch.

The AC/DC converter E4 outputs a detection signal that indicates whether the high voltage power is supplied to the AC/DC converter to an input port P6 of the charging control apparatus 1.

Next, a control procedure of the charging control apparatus 1 when charging the battery E2 by the charging cable CC will be explained with reference to a flow chart in FIG. 2 and timing charts in FIG. 3.

Figure 3:
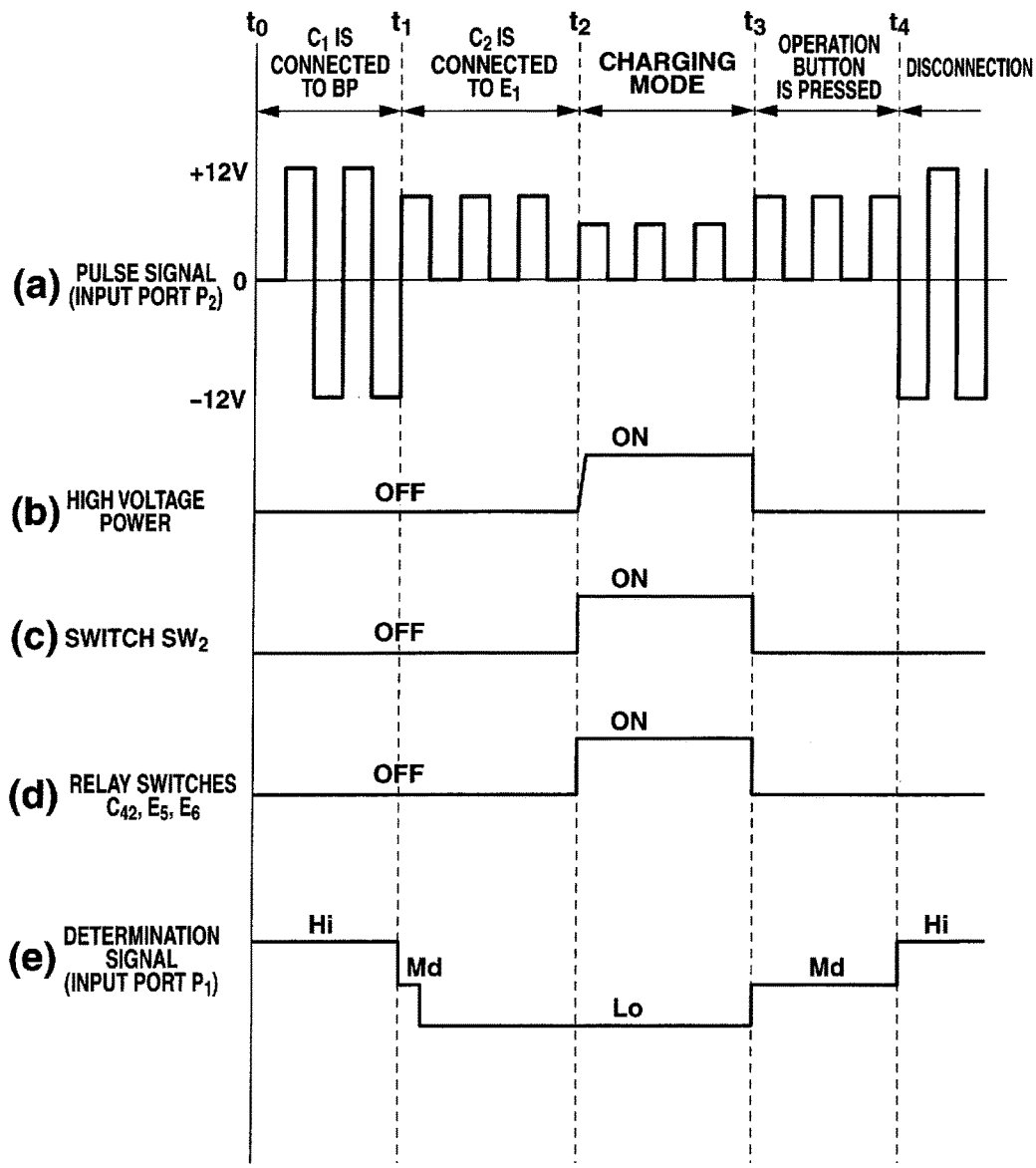
FIG. 3 is timing charts in the charging control of FIG. 2.

In FIG. 3, when the charging control apparatus 1 is in a standby state, at time t0, the first connector C1 of the charging cable CC is connected to an electric outlet of the external power supply BP. Subsequently, at time t1, the second connector C2 of the charging cable CC is connected to the charging inlet E1.

When the first connector C1 of the charging cable CC is connected to the electric outlet of the external power supply BP at time t0, since current flows in the signal generating section C41 shown in FIG. 1, the pulse signal having a predetermined level (e.g. ±12V), a predetermined duty cycle and a predetermined frequency (e.g. 1 kHz) is outputted from the signal generating section C41 (see time chart (a) of the pulse signal between time t0 and time t1 in FIG. 3).

FIG. 3 (a) shows the pulse signal inputted to the input port P2 of the charging control apparatus 1. Here, since the second connector C2 and the charging inlet E1 are not connected between time t0 and t1, in actual fact the pulse signal inputted to the input port P2 is zero. However, for the sake of convenience, FIG. 3 (a) shows the pulse signal outputted from the signal generating section C41.

Since the second connector C2 is not connected to the charging inlet E1 for this time t0~t1, the AC/DC converter E4 is not supplied with the high voltage power (see time chart (b) of the high voltage power between time t0 and time t1 in FIG. 3). Further, since the second connector C2 is not connected to the charging inlet E1 for this time t0~t1, a signal level of a determination signal inputted to the input port P1 from the connection state determining circuit E17 is a high level Hi (a first level) that is determined by the power supply E18 and the resistance elements R7, R8 and R9 (see time chart (e) of the determination signal in FIG. 3). Therefore, the switch SW2 of the interface circuit E16 is in the open state (OFF) (see time chart (c) of the switch SW2 between time t0 and time t1 in FIG. 3). Likewise, each of the relay switches C42, E5 and E6 is also in the open state (OFF) (see time chart (d) of the relay switch between time t0 and time t1 in FIG. 3).

Here, the duty cycle of the pulse signal generated in the signal generating section C41 is a value that is set on the basis of current-carrying capacity feedable to the electric vehicle EV from the external power supply BP through the charging cable CC, and it is set for each charging cable CC. For example, in a case where the current-carrying capacity is 12A, the duty cycle is 20%. In a case where the current-carrying capacity is 24A, the duty cycle is 40%.

When the second connector C2 is connected to the charging inlet E1 at time t1 in FIG. 3, since the connection judging circuit C21 and the connection state determining circuit E17 are connected through the output signal line L2, the signal level of the determination signal inputted to the input port P1 of the charging control apparatus 1 shifts to a low level Lo (a second level) by a resistance voltage dividing circuit formed by adding the resistance element R2 to the power supply E18 and the resistance elements R7, R8 and R9. The charging control apparatus 1 judges that the second connector C2 is connected to the charging inlet E1 by detecting the determination signal of the Lo level, and the routine proceeds from step S1 to step S2 in the flow chart in FIG. 2.

Here, at the instant when the second connector C2 is connected to the charging inlet E1 (i.e. in the instant after the time t1 or just after the time t1), the lock system of the second connector C2 momentarily opens and closes, and the switch SW1 is momentarily brought to the open state (OFF) in response to this instantaneous open of the lock system. Thus, the signal level of the determination signal inputted to the input port P1 momentarily shifts to a middle level Md by a resistance voltage dividing circuit formed by adding the resistance elements R2 and R3 to the power supply E18 and the resistance elements R7, R8 and R9. However, in the present embodiment, the shift to this middle level Md is disregarded. In the following description, the determination signal at time t1 is the one that indicates the low level Lo except the instant after the time t1.

At time t1 in FIG. 3, the pulse signal generated in the signal generating section C41 is inputted to the input port P2 of the charging control apparatus 1 through the control signal line L1. At this time, the pulse signal is inputted as a pulse signal of a predetermined level which depends on the resistance element R5 of the interface circuit E16. For instance, as shown by the time chart (a) of the pulse signal between time t1 and time t2 in FIG. 3, the pulse signal becomes a pulse signal having +9V.

When the charging control apparatus 1 detects the pulse signal of +9V inputted to the input port P2, the routine proceeds from step S2 to step S3. Further, after a lapse of a predetermined time X, the routine proceed to step S4.

Figure 2:
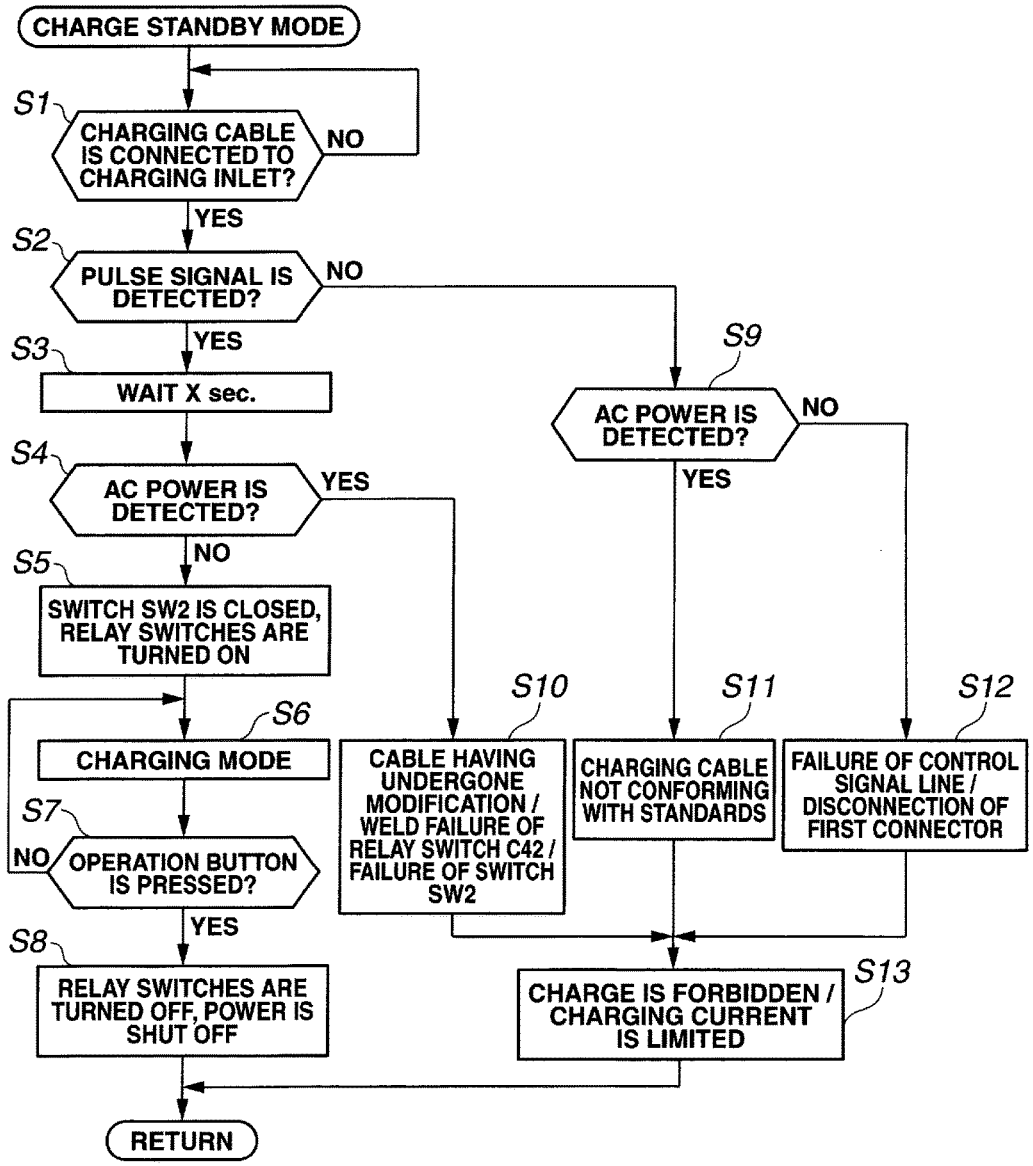
FIG. 2 is a flow chart showing a procedure of a discharging control of a charging control apparatus of FIG. 1.

At step S4 in FIG. 2, when the charging control apparatus 1 detects that the AC/DC converter E4 is supplied with no power, the routine proceeds to step S5, and the charging control apparatus 1 outputs the ON command signal (switch-ON command signal or switch-closing command signal) of the switch SW2 from the output port P3.

When the switch SW2 shifts to the closed state (ON), the pulse signal inputted to the input port P2 of the charging control apparatus 1 from the signal generating section C41 through the control signal line L1 lowers by a voltage dividing circuit of the resistance elements R5 and R6. Then as shown by the time chart (a) of the pulse signal after time t2 in FIG. 3, the pulse signal changes to a pulse signal of, for instance, +6V. When the charging control apparatus 1 detects this change of the pulse signal, the charging control apparatus 1 outputs a command signal that closes the relay switch C42 of the control unit C4 to the control unit C4. Simultaneously, the charging control apparatus 1 outputs the command signal that closes the relay switch E5 to the relay switch E5, also outputs the command signal that closes the relay switch E6 to the vehicle controller E7. By these ON operations of the relay switches C42, E5 and E6, a charging mode starts (at step S6 in FIG. 2), and the power from the external power supply BP is supplied to the battery E2 through the power line C3 of the charging cable CC (time t2~t3 in FIG. 3).

Here, when the operation button C22 of the second connector C2 is pressed in a state of the charging mode of step S6 (at step S7 in FIG. 2, at time t3 in FIG. 3), the routine proceeds to step S8, and the switch SW1 of the connection judging circuit C21 is brought to the open state (OFF). With this, the signal level of the determination signal inputted to the input port P1 of the charging control apparatus 1 rises from the Lo level by a voltage corresponding to the resistance element R3 of the connection judging circuit C21 and shifts to the Md level (a third level). That is, the signal level of the determination signal inputted to the input port P1 shifts to the middle level Md by a resistance voltage dividing circuit formed by the resistance elements R7 and R8 of the parallel connection and the resistance elements R2 and R3 connected in series, with respect to the power supply E18.

When the charging control apparatus 1 detects this rise of the voltage level of the determination signal inputted to the input port P1, the charging control apparatus 1 judges that the second connector C2 is going to be disconnected from the charging inlet E1, and outputs the command signals that open the relay switches C42, E5 and E6.

With this operation, since the power supplied from the external power supply BP through the power line C3 of the charging cable CC is shut off, the operator can safely disconnect the second connector C2 from the charging inlet E1. When the second connector C2 is disconnected from the charging inlet E1, the signal level of the determination signal inputted to the input port P1 returns to the original Hi level (at and after time t4 in FIG. 3).

Figure 4:
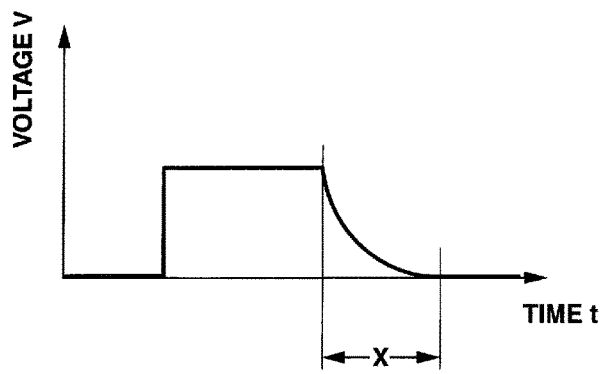
FIG. 4 is a characteristic diagram of residual voltage by a noise-absorbing capacitor.

Here, in FIG. 2, the reason why after a lapse of the predetermined time X at step S3, the power of the AC/DC converter E4 is detected is because there is a risk that if charge is accumulated in the capacitor C of the LC filter E3, the detection will not correctly be made due to the influence of residual voltage shown in FIG. 4. That is, since it takes the time X for the capacitor C to discharge the charge after the power supply to the AC/DC converter E4 is shut off, the power is detected after the time X elapses, thereby preventing the misdetection.

In the above description, the charging control procedure in a case where the charging cable CC has no problem or is not in an abnormal condition and also specifications of the charging cable CC meet the SAE standards has been explained. However, there is a request that the charge is forbidden or stopped or a request to further improve safety by limiting a quantity of charge when the charging cable does not meet the SAE standards. For these requests, the charging control apparatus 1 performs the following control.

A judgment as to whether the charging cable conforms to the SAE standards is made by the following checks carried out at steps S1, S2 and S4 in FIG. 2. That is, after checking that the first connector C1 of the charging cable CC is connected to the external power supply BP and the second connector C2 is connected to the charging inlet E1 at step S1, the charging control apparatus 1 checks that the level of the pulse signal inputted to the input port P2 of the charging control apparatus 1 is the predetermined level (+9V) at step S2 also checks that the power supplied to the AC/DC converter E4 is zero at step S4, thereby judging whether the charging cable conforms to the SAE standards.

At step S2 in FIG. 2, if the pulse signal of the predetermined level is not inputted to the input port P2 of the charging control apparatus 1 despite the fact that the charging cable CC is connected to the external power supply BP and connected to the charging inlet E1, the routine proceeds to step S9, and the power supplied to the AC/DC converter E4 is detected.

At step S9, if the AC/DC converter E4 is supplied with the power, the routine proceeds to step S11, and it is judged that the charging cable CC is a cable that does not conform to the SAE standards. That is, it is judged that the charging cable CC is a cable that has no control unit C4 and has only the power line C3. Then the routine proceeds to step S13, and a command signal for forbidding the charge or limiting the charging current is outputted to the AC/DC converter E4.

At step S9, if no power is supplied to the AC/DC converter E4, the routine proceeds to step S12. At step S12, it is judged that the first connector C1 of the charging cable CC is disconnected from the electric outlet of the external power supply BP or the control signal line L1 is broken or in a defective condition. Then the routine proceeds to step S13, and the command signal for forbidding the charge or limiting the charging current is outputted to the AC/DC converter E4.

Further, at step S4, if the power is supplied to the AC/DC converter E4 despite the fact that the pulse signal of step S2 is inputted, the routine proceeds to step S10. Then at step S10, it is judged that the charging cable CC is a cable that has undergone modification such as retrofit of the control unit C4 and does not conform to the SAE standards. Or it is judged that although the charging cable CC is a cable that conforms to the SAE standards, a weld failure occurs in the relay switch C42 or a failure occurs in the switch SW2 of the charging inlet E1. Also in this case, the routine proceeds to step S13, and the command signal for forbidding the charge or limiting the charging current is outputted to the AC/DC converter E4.

As explained above, according to the charging control apparatus of the present invention, by detecting the pulse signal inputted to the input port P2 and the power signal of the AC/DC converter E4 after connecting the charging cable CC to the charging inlet E1 of the vehicle until the main switches E5 and E6 of the power line E8 on the vehicle side are switched ON, when the power signal is inputted ("YES" at step S4, "YES" at step S9, in FIG. 2) and the pulse signal is also inputted ("YES" at step S2) or the pulse signal is not inputted ("NO" at step S2), it is possible to judge that at least there is a possibility that the charging cable will be the cable not conforming to the SAE standards.

Further, upon the detection of the power signal, by setting the time X (a waiting time or a delay time) at step S3 in FIG. 2, it is possible to prevent the misdetection caused by the residual voltage when the circuit having the capacitor C such as the LC filter E3 is provided on the power line E8.

In the above description, the first connector C1, the second connector C2, the power line C3 and the ground wire C5 correspond to a power feed unit (a power feed means) of the present invention. The control unit C4 corresponds to a control unit (a control means) of the present invention. The charging control apparatus 1 corresponds to a control signal detection section (a control signal detection means), a power detection section (a power detection section means), a judgment section (a judgment means) and a charging limitation section (a charging limitation means) of the present invention. The connection judging circuit C21 and the connection state determining circuit E17 correspond to a connection determination section (a connection determination means) of the present invention.

REFERENCE SIGN LIST

EV electric motor (vehicle)
E1 charging inlet
E11~E15 terminals
E16 interface circuit
E17 connection state determining circuit (connection determination section)
E18 power supply
E2 battery
E3 LC filter
E4 AC/DC converter
E5, E6 relay switches (main switches)
E7 vehicle controller
E8 power line (power supply line)
BP external power supply (power supply outside the vehicle)
CC charging cable
C1 first connector (power feed unit)
C2 second connector (power feed unit)
C21 connection judging circuit (connection determination section)
C22 operation button C22
C23, C24 power terminals
C25 ground terminal
C26, C27 signal terminals
C3 power line (power feed unit)
C4 control unit C4 (control unit)
C41 signal generating section
C42 relay switch
C5 ground wire (power feed unit)
R1~R9 resistance elements
L1 control signal lines
L2 output signal line
P1, P2 input ports SW1, SW2 switches
D1 diode
L coil
C capacitor
1 charging control apparatus

The invention claimed is:

1. A charging control apparatus for judging conformity of a charging cable to SAE (Society of Automotive Engineers) cable standards, the charging cable having a power feed unit for supplying power to a vehicle from an external power supply provided outside the vehicle and a control unit for generating a control signal and outputting the control signal to the vehicle, the charging control apparatus comprising:
a control signal detection section that detects the control signal;
a power detection section that detects the power; and
a judgment section that judges conformity of the charging cable to the SAE cable standards on a basis of the control signal detected by the control signal detection section and the power detected by the power detection section after the charging cable is connected to a charging inlet of the vehicle until a main switch of a power feed line on a vehicle side is switched ON.

2. The charging control apparatus as claimed in claim 1, wherein
the judgment section judges that the charging cable does not conform to the standards when no control signal is detected and the power is detected.

3. The charging control apparatus as claimed in claim 1, wherein
the judgment section judges that the charging cable does not conform to the standards when the control signal is detected and the power is detected.

4. The charging control apparatus as claimed in claim 1, wherein
the power detection section detects the power after a lapse of a predetermined time from the connection of the charging cable to the charging inlet of the vehicle.

5. The charging control apparatus as claimed in claim 1, further comprising:
a charging limitation section that, when judging that the charging cable does not conform to the standards, forbids the charge or limits a charging current through the charging cable.

6. The charging control apparatus as claimed in claim 1, wherein the power detected by the power detection section is AC power.

7. A charging system comprising:
a charging cable having:
(a) a power feed unit for supplying power to a vehicle from an external power supply provided outside the vehicle, and
(b) a control unit for generating a control signal and outputting the control signal to the vehicle;
a control signal detection section that detects the control signal;
a power detection section that detects the power; and
a judgment section that judges conformity of the charging cable to SAE (Society of Automotive Engineers) cable standards on a basis of the control signal detected by the control signal detection section and the power detected by the power detection section after the charging cable is connected to a charging inlet of the vehicle until a main switch of a power feed line on a vehicle side is switched ON.

8. The charging system as claimed in claim 7, wherein the power feed unit of the charging cable has
a first connector that connects to the external power supply provided outside the vehicle;
a second connector that connects to the charging inlet of the vehicle; and
a power line that is provided between the first connector and the second connector to supply the power to the vehicle from the external power supply, and
the control unit of the charging cable has
a signal generating section that generates the control signal when the first connector is connected to the external power supply; and
a control signal line, one end of which is connected to the control unit and the other end of which is connected to the second connector, to send the control signal.

9. The charging system as claimed in claim 8, further comprising:
a connection determination section that outputs the following determination signals:
(a) a determination signal of a first level when the second connector is not connected to the charging inlet,
(b) a determination signal of a second level that differs from the first level when the second connector is connected to the charging inlet, and
(c) a determination signal of a third level that differs from the first and second levels when an operation button is pressed to disconnect the second connector from the charging inlet.

10. The charging system as claimed in claim 8, wherein the judgment section judges a failure of the control signal line when the control signal is not detected and the power is not detected.

11. The charging system as claimed in claim 10, further comprising:
a charging limitation section that, when judging that the charging cable does not conform to the standards or the failure of the control signal line, forbids the charge or limits a charging current through the charging cable.

12. A method for controlling charge after judging whether a charging cable connected to a charging inlet of a vehicle conforms to SAE (Society of Automotive Engineers) cable standards, the method comprising:
detecting whether a control signal is output from the charging cable and whether power is supplied from the charging cable after the charging cable is connected to the charging inlet until a main switch of a power feed line of the vehicle is switched ON;
judging that the charging cable does not conform to the SAE cable standards at least when no control signal is detected and the power is detected; and
forbidding the charge or limiting a charging current through the charging cable when judging that the charging cable does not conform to the SAE cable standards.

* * * * *